United States Patent Office 3,438,937
Patented Apr. 15, 1969

3,438,937
PROCESS FOR CURING POLYEPOXIDES AND RESULTING PRODUCTS
Samuel H. Christie, Warren Township, N.J., assignor to Shell Oil Company, New York, N.Y., a corporation of Delaware
No Drawing. Continuation-in-part of application Ser. No. 277,465, May 2, 1963. This application Oct. 19, 1964, Ser. No. 404,909
Int. Cl. C08g *30/14, 30/16*
U.S. Cl. 260—47
6 Claims

ABSTRACT OF THE DISCLOSURE

This invention relates to a process for curing polyepoxides. More particularly, then invention relates to a new process for curing polyepoxides, using a special type of cyclic curing agent, and to the useful products obtained therefrom.

Specifically, the invention provides a new process for curing and resinifying polyepoxides, and preferably glycidyl polyethers of polyhydric phenols of polyhydric alcohols, which comprises mixing and reacting the polyepoxide with certain heterocyclic compounds which possess in the heterocyclic ring (1) a substituted imino group C=N—C, and (2) a secondary amino group, and preferably an imidazole compound, such as 2-ethyl-4-methyl imidazole. The invention further provides hard resinous products obtained by the above-described process.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. Many conventional polyepoxide curing agent systems, however, have certain drawbacks that greatly limit the industrial use of the polyepoxides. For example, the known mixtures comprising the polyepoxides and aliphatic amines set up rather rapidly, and this is true even though the mixtures are stored in air tight containers away from moisture and air. This difficulty necessitates mixing of the components just before use and rapid use of the material before cure sets in. Such a procedure places a considerable burden on the individual operators, and in many cases, gives inferior products because of the inefficient mixing and too rapid operations.

Attempts have been made in the past to solve the above problem by the use of curing agents which are more difficult to react and would thus remain inactive in the polyepoxide composition at lower temperatures. While this action tends to lengthen the pot life or working time of the compositions, it also makes the compositions more difficult to cure. For example, it is known that the pot life can be extended by the use of aromatic amines, but this in turn requires the use of much higher temperatures to effect the ultimate cure. High cure temperatures are undesirable for many epoxy resin applications, such as filament winding operations, encapsulation and the like. It would be desirable to have a curing agent that would give a long pot life and at the same time be effective as a curing agent at the desired lower reaction temperatures to give products having good physical properties.

It is an object of the invention, therefore, to provide a new class of curing agents for polyepoxides. It is a further object to provide new curing agents for polyepoxides that give compositions having a relatively long pot life, but are highly reactive at moderately elevated temperatures. It is a further object to provide a new process for curing polyepoxides that is particularly adapted for use in filament winding operations, encapsulation and the like. It is a further object to provide a new process for curing polyepoxides to give cured products having good physical properties. It is a further object to provide new cured products having improved elevated temperature properties. It is a further object to provide new compositions which are useful and valuable in preparing coatings, castings and the like. These and other objects of the invention will be apparent from the following detailed description thereof.

It has now been discovered that these and other objects may be accomplished by the use as curing agents for the polyepoxides certain heterocyclic compounds which possess in the ring (1) a substituted imino group C=N—C, and (2) a secondary amino group, and preferably an imidazole compound, such as 2-ethyl-4-methyl imidazole. It has been surprisingly found that polyepoxide compositions containing these imidazole compounds have a relatively good pot life at the lower temperatures. When these materials, however, are heated to moderate temperatures, such as 50° C. and above, the mixtures set up to form the hard cured cross-linked product. This advantage is particularly desirable for applications where a long pot life is needed but high curing temperatures are undesirable such as in the formation of pottings for certain electrical apparatus, filament winding operations, coatings for foams, coatings for certain military equipment and the like.

Additional advantage is also found in the fact that even though the cure takes place at the moderate temperatures, the resulting products still have excellent physical properties, and particularly good elevated temperature properties. It was thought that such properties could be obtained only by use of curing agents such as aromatic amines at high cure temperatures.

The new curing agents to be used in the process of the invention comprise the heterocyclic compounds possessing in the heterocyclic ring (1) a substituted tertiary imino group, i.e., a C=N—C group, and (2) a secondary amino group, i.e., a >N—H group. Preferred examples of these compounds include, among others, the imidazoles, such as compounds of the formula

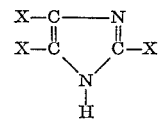

wherein X is hydrogen, halogen, or an organic radical, such as a hydrocarbon radical or substituted hydrocarbon radicals as the ester, ether, amide, imide, amino, halogen, or mercapto substituted hydrocarbon radicals. The X's on adjacent carbon atoms may also be joined together to form a cyclic radical, such as an aromatic ring, cycloalkenyl ring and the like. Especially preferred are the imidazoles wherein X is a hydrogen or a hydrocarbon radical, and preferably an alkyl, cycloalkyl, cycloalkenyl, aryl, alkaryl or arylalkyl radicals, and particularly those containing no more than 15 carbon atoms. Example of such compounds include, among others, 2-ethyl-4-methyl imidazole, 4 - butyl - 5 - ethyl imidazole, 2 - cyclohexyl-4-methyl imidazole, 2-butoxy-4-allyl imidazole, 2-carboethoxybutyl-4-methyl imidazole, 2-octyl-4-hexyl imidazole, and 2-ethyl-4-phenyl imidazole, and mixtures thereof. Especially preferred are the liquid imidazoles and particularly the alkyl-substituted imidazoles wherein the alkyl groups contain not more than 8 carbon atoms each, or mixtures thereof.

Coming under special consideration, particularly because of the superior stability and resulting physical properties, are the cyclic substituted imidazoles, and preferably those of the formula

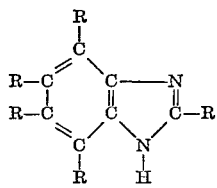

wherein R is selected from hydrogen, halogen, or an organic radical, such as a hydrocarbon radical or substituted hydrocarbon radical, for example, an ester, ether, amide, imide, amino, halogen or mercapto-substituted hydrocarbon radical, said organic radicals preferably containing up to 15 carbon atoms, and still more preferably up to 8 carbon atoms. Examples of such compounds include, among others, benzimidazole, methylbenzimidazole, dimethylbenzimidazole, chlorobenzimidazole, mercaptobenzimidazole, methoxybenzimidazole and the like, and mixtures thereof.

The above-described imidazoles can be prepared by conventional techniques of reacting a dialdehyde with ammonia and formaldehyde.

The polyepoxides to be used in preparing the compositions of the present invention comprise those materials possessing more than one vicinal epoxy group, i,e., more than one

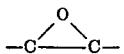

group. These compounds may be saturated or unsaturated, aliphatic, cycloaliphatic, aromatic or heterocyclic and may be substituted with substituents, such as chlorine, hydroxyl groups, either radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecandienoate, butyl 9,12,15- octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the inventon include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri (2,3 - epoxybutyl) 1,2,4 - butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl cyclohexane-1,2-dicarboxylate, di (4,5-epoxyoctadecyl) malonate.

Another group of the epoxy-containing materials includes those epoxidized esters of unsaturated alcohols and unsaturated carboxylic acids, such as 2,3-epoxybutyl 3,4- epoxypentanoate, 3,4-epoxyhexyl, 3,4-epoxypentanoate, 3,4-epoxycyclohexyl, 3,4-epoxycyclohexanoate, 3,4-epoxycyclohexyl 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11, 12-diepoxyoctadecanedioate, dioctyl 10,11-diethyl-8,9,12, 13-diepoxy-eiconsanedioate, dihexyl 6,7,10,11-diepoxyhexadecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diexopycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene, acrylonitrile copolymers (Hycar rubbers) butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl) ethane (epoxy value of 0.45 eq/100 g. and melting point 85° C.), polyglycidyl ether of 1,1,5,5-tetrakis(hydroxyphenyl) pentane (epoxy value of 0.514 eq/100 g.) and the like and mixtures thereof. Other examples include the glycidated novolacs as obtained by reacting epichlorohydrin with novon resins obtained by condensation of aldehyde with polyhydric phenols.

The quantities in which the polyepoxides and the heterocyclic curing agents are combined will vary over a wide range. To obtain the best cure, the heterocyclic curing agent is preferably employed in amounts varying from about 0.1% to about 50% by weight of the polyepoxide, and still more preferably from 5 to 30% by weight of the polyepoxide.

The heterocyclic curing agent can be used in combination with other components such as phenols, mercaptans, triphenyl phosphorus, triphenyl arsenic, triphenyl antimony, amines, amine salts or quaternary ammonium salts, etc. Preferred additives include the mercaptans, phenols, triphenyl phosphorus and the amines, such as, for example, benzyldimethylamine, dicyandiamide, p,p'-bis(dimethylaminophenyl) methan, pyridine, dimethyl aniline, benzyldimethylamine, dimethylethanolamine, methyldiethanolamine, morpholine, dimethylaminopropylamine, dibutylaminopropylamine, stearyldimethylamine, tri-n-butylamine, triamylamine, tri-n-hexylamine, ethyl di-n-propylamine, phenylene diamine, diethylene triamine and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof. Other additives include polybasic anhydrides, such as, for example, phthalic anhydride, tetrahydrophthalic anhydride, methyl-3-,6-endomethylene-4-tetrahydrophthalic anhydride, chlorendic anhydride, pyromellitic dianhydride, and the like, and the corresponding acids.

The above-noted additives are generally employed in amounts varying from 0.1 parts to 25 parts per 100 parts of polyepoxide, and preferably from 1 part to 5 parts per 100 parts of polyepoxide.

The curing of the polyepoxides may be accomplished by merely mixing the polyepoxides with the heterocyclic curing agent and heating the combined mixture. If the polyepoxide is a solid or if the heterocyclic curing agent is somewhat viscous or solid, the mixing may be accomplished by heating the components or by use of common solvents. Suitable common solvents include benzene, toluene, cyclohexane, ketones, ethers, esters, nitriles, and the like. Monoepoxy diluents, such as butyl glycidyl ether, phenyl glycidyl ether, and the like may also be employed. One may also employ nonreactive diluents, such as coal tars, refined coal tars, coal tar pitches, asphalts, pine tar, pine oil, extracts of lube oil distillates, and the like.

The temperatures employed during the cure may vary over a wide range. In general, temperatures ranging from about 40 to 300° C. will give satisfactory results. Preferred temperatures range from about 50 to 250° C.

The resinified products obtained by the above-described process have surprisingly high heat deflection temperature and strength values at elevated temperatures. In addition, they display good resistance to boiling water and powerful solvents and chemicals. These unusual properties make the process of particular value in the preparation of adhesives, laminates and molded articles.

The compositions of the invention are particularly useful for filament winding applications. In this application, the filaments, such as, for example, glass fibers, are passed into and through the liquid compositions of the invention and then wound onto the desired mandrel or form and the formed unit allowed to cure, preferably by application of heat. The great advantage of the new compositions in this application is the fact that the compositions can be cured at low temperatures and their use would not affect heat sensitive material being used in the application. For example, the rubber lining of missile cases are heat sensitive and would be affected by the use of high temperatures in curing filaments wound thereon. The new compositions thus could be used for the filament winding of these cases where the winding is directly on the liner.

The compositions of the invention are also particularly useful for encapsulation of electrical or other types of equipment. In many cases it is important to hold such apparatus or equipment in rigid position so that the tubes or other delicate pieces will not be jarred out of position. The epoxy resins are particularly useful for this application because of their good non-conducting properties. The need for heat in curing the epoxy resin, however, had limited their application in this field. The present compositions, however, that can be cured at lower temperatures will find wide use in this field. In such operations, the desired polyepoxide and heterocyclic curing agent are mixed together and the resulting mixture poured in a mold which surrounds the electrical apparatus. After application of slight amount of heat, the composition sets up to the hard cured casting and the encapsulated apparatus can be removed from the mold.

The new compositions of the invention are also useful as adhesives. In this application they can be used as a paste or solution depending on the method of preparation as described above. Other materials may also be included in the composition, such as pigments, plasticizers, stabilizers and reinforcing fillers, such as aluminum powder, asbestos, powdered mica, zinc dust, bentonite, ground glass fibers, monetta clay and the like. These fillers are preferably used in amounts varying from about 10 parts to 200 parts per 100 parts of the polyepoxide and curing agent. Other materials that may be included include other types of resins, such as phenol-aldehyde resins, urea-aldehyde resins, furfural resins, polyacetal resins, polycarbonate resins, polyamide resins, and the like.

The compositions may be used in the bonding of a great variety of different materials, such as metal-to-metal to other materials, such as plastic, wood-to-wood, glass-to-glass, glass-to-metal, and the like. They are of particular value, however, in the bonding of metals such as aluminum-to-aluminum and steel-to-steel. When applied as an adhesive, the compositions may simply be spread on the desired surface to form films of various thicknesses, e.g., 0.5 mils to 30 mils, and then the other surface superimposed and heat applied. Curing pressures can be light contact pressures up to about 500 p.s.i.

The compositions are also useful for preparing laminates. In preparing the laminate, the sheets of fibrous material are first treated with the mixture of polyepoxide and curing agent. This is conveniently accomplished by spreading the paste or solution containing the above-noted mixture onto the sheets of glass cloth, paper, textiles, etc. The sheets are then superimposed and the assembly cured under heat and pressure. The assembly is preferably cured in a heated press under a pressure of about 25 to 500 or more pounds per square inch and temperatures of about 100 to 300° C. The resulting laminate is extremely strong and resistance against heat and the action of organic and corrosive solvents.

The fibrous material used in the preparation of the laminates may be of any suitable material, such as glass cloth and matting, paper, asbestos paper, mica flakes, cotton bats, duck muslin, canvas, synthetic fibers, such as nylons, Dacron, and the like. It is usually preferred to utilize woven glass cloth that has been given prior treatment with well known finishing or sizing agents, therefore, such as chrome methacrylate or vinyl trichlorosilane.

To illustrate the manner in which the invention may be carried out, the following examples are given. It is to be understood, however, that the examples are for the purpose of illustration and invention is not to be regarded as limited to any of the specific materials or conditions recited therein. Polyepoxides referred to by letter are those described in U.S. 2,633,458.

EXAMPLE I

This example illustrates the use of 2-ethyl-4-methyl imidazole to cure Polyether A [i.e., a glycidyl ether of 2,2-bis(4-hydroxyphenyl)propane].

One hundred parts of Polyether A was combined with 10 parts of 2-ethyl-4-methyl imidazole. This composition when kept at room temperature had a pot life of >8 hours. A portion of the composition cured for 8 hours at 60° C. was converted to a hard insoluble infusible casting having excellent heat distortion temperature, hardness, strength and chemical resistance. The heat distortion temperature and strength values are shown in the following table (A) in comparison to HDT values and strengths and related compositions prepared by the use of conventional aromatic curing agent metaphenylene diamine (14.3 parts) which was cured 2 hours at 80° C. and 2 hours at 150° C., (B) and another conventional curing agent tri(2-ethylhexoic acid) salt of tri(dimethylaminomethylphenol) cured at 60° C. for 8 hours (12 parts) (C):

|  | A | B | C |
|---|---|---|---|
| HDT, ° C | 110 | 150 | 67 |
| Max. tensile str., p.s.i.: |  |  |  |
| 23° C | 12,600 | 13,300 | 11,100 |
| 100° C | 5,000 | 7,700 |  |
| Tensile modulus, p.s.i.: |  |  |  |
| 23° C | 460,000 | 440,000 | 500,000 |
| 100° C | 150,000 | 300,000 |  |

EXAMPLE II

One hundred parts of Polyether A were combined with 10 parts of 2-ethyl-4-methyl imidazole and the mixture used in a filament winding application to prepare Naval Ordnance Laboratory (NOL) rings. In this application glass fibers (12-end E-HTS glass) were passed into and through this composition and then wound on a mandrel to form the ring. The resulting product was cured for 8 hours at 60° C. and the resin content was 15%.

Some of the properties of the resulting product (A) are shown in the following table in comparison to properties of a similar product prepared from the mixture of Polyether A and meta-phenylene diamine as noted in Example I(B):

| System | A | B |
|---|---|---|
| Tensile strength, max. p.s.i., 23° C | 200,000 | 210,000 |
| Glass stress, max. p.s.i., 23° C | 310,000 | 290,000 |
| Tensile modulus, p.s.i. | 6,400,000 | 6,500,000 |
| Horizontal shear strength, p.s.i.: |  |  |
| 23° C | 9,200 | 9,100 |
| 150° C | 6,600 | 4,600 |

EXAMPLE III

About 100 parts of Polyether A are combined with 10 parts of 2-butyl-4-ethyl imidazole and the mixture kept at 60° C. for several hours. The resulting product is a hard insoluble infusible product having good high temperature properties.

EXAMPLE IV

Examples I and II are repeated with the exception that the Polyether A is replaced by an equivalent amount of Polyether B and C. Related results are obtained.

EXAMPLE V

About 100 parts of diglycidyl ether of resorcinol are combined with 15 parts of 2-hexyl-4-phenyl imidazole and the mixture heated at 70° C. for several hours. The resulting product is a hard insoluble infusible product having good high temperature properties.

EXAMPLE VI

About 100 parts of a glycidated novolac resin obtained by reacting a phenol-formaldehyde condensate with epichlorohydrin is mixed with 15 parts of 2-ethyl-4-methyl imidazole. This mixture is heated to 70° C. for several hours. The resulting product is a hard insoluble infusible product having good high temperature properties.

EXAMPLE VII

Example I is repeated with the exception that Polyether A is replaced by a 50:50 mixture of Polyether A and epoxidized methyl cyclohexenyl methylcyclohexenecarboxylate. Related results are obtained.

EXAMPLE VIII

Examples I to III are repeated with the exception that the curing agent is 2,4-di(chlorobutyl)imidazole, and 2,4-dioctyl imidazole. Related results are obtained.

EXAMPLE IX 50 parts of Polyether A were combined with 50 parts of tetraglycidyl ether of 1,1,2,2-tetrakis(hydroxyphenyl) ethane and 4 parts of benzimidazole. This mixture was used in a filament winding application to prepare Naval Ordnance Laboratory (NOL) rings. In this application, glass fibers (12-end E-HTS glass) were passed into and through this composition and then wound on a mandrel to form the ring. The resin content was 15.5%. The product was cured for 3 hours at 150° C. The resulting product had a horizontal shear strength, p.s.i. at 23° C. of 12,400 and at 150° C. of 5,600. Approximate prepreg shelf life in weeks at 23° C. was greater than 16.

EXAMPLE X

The preceding example was repeated with the exception that the ratio of components was 50 parts Polyether A, 50 parts of the tetraglycidyl ether and 15 parts of benzimidazole. The rings were cured for 4 hours at 150° C. The resin content was 24.7%. The resulting product had a horizontal shear strength p.s.i. at 23° C. of 11,800 and at 150° C. of 5,500. Approximate prepreg shelf life in weeks at 23° C. was greater than 10.

EXAMPLE XI

Example I is repeated with the exception that the curing agent employed is as follows: 2-methyl imidazole, 2-butyl 4-allyl imidazole, 2,5-dichloro 4-ethyl imidazole, 2-methyl 4-mercaptoethyl imidazole, 2-ethyl 4-(2-ethylamino) imidazole and 2-carboethoxybutyl 4-methyl imidazole, methylbenzimidazole, dichlorobenzimidazole. Related results are obtained.

This application is a continuation-in-part of my application Ser. No. 277,465, filed May 2, 1963, now abandoned.

I claim as my invention:

1. A process for curing a polyepoxide having more than one vic-epoxy group which comprises mixing and reacting at a temperature above 40° C. the polyepoxide with a curing amount of an imidazole compound of the formula $$\begin{array}{c} R \\ | \\ C \\ R-C \diagup \diagdown C-N \\ R-C \diagdown \diagup C \diagup \diagdown C-R \\ C \quad N \\ | \quad | \\ R \quad H \end{array}$$

wherein R is a member of the group consisting of hydrogen, halogen, hydrocarbon radicals, halogen-substituted hydrocarbon radicals, ester-substituted hydrocarbon radicals and mercaptan-substituted hydrocarbon radicals.

2. A curable composition comprising a mixture of a polyepoxide possessing more than one vic-epoxy group and a curing amount of an imidazole compound of the formula $$\begin{array}{c} R \\ | \\ C \\ R-C \diagup \diagdown C-N \\ R-C \diagdown \diagup C \diagup \diagdown C-R \\ C \quad N \\ | \quad | \\ R \quad H \end{array}$$

wherein R is a member of the group consisting of hydrogen, halogen, hydrocarbon radicals, halogen-substituted hydrocarbon radicals, ester-substituted hydrocarbon radicals and mercaptan-substituted hydrocarbon radicals.

3. A curable composition comprising a mixture of (1) a glycidyl polyether of a polyhydric phenol, and (2)

from 0.1% to 10% by weight of an imidazole compound of the formula

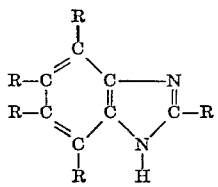

wherein R is a member of the group consisting of hydrogen, halogen, hydrocarbon radicals, halogen-substituted hydrocarbon radicals, ester-substituted hydrocarbon radicals and mercaptan-substituted hydrocarbon radicals.

4. A process as in claim 1 wherein the polyepoxide is a glycidyl polyether of a polyhydric phenol having a 1,2-epoxy equivalency between 1.1 and 2.0 and a molecular weight between 200 and 900.

5. A process as in claim 1 wherein the imidazole compound is benzimidazole.

6. A curable composition comprising a polyepoxide having more than one vic-epoxy group and a curing amount of benzimidazole.

References Cited

UNITED STATES PATENTS 2,994,685    8/1961    Delmonte et al.
3,030,376    4/1962    Liggett et al.

OTHER REFERENCES

Skeist: "Epoxy Resin," pp. 148–149 relied on, Reinhold Pub. Corp., New York, 1958.

Houdry Process Corp. Preliminary Data Bulletin, "Imidazoles," 11 pages, p. 6 particularly relied on.

WILLIAM H. SHORT, *Primary Examiner.*

LOUISE P. QUAST, *Assistant Examiner.*

U.S. Cl. X.R.

156—130; 161—184, 185, 186; 260—2, 18, 24, 33.6, 37, 59, 75, 78.4, 88.3, 309, 348, 830, 831, 832, 833, 834